3,081,854
TORQUE TRANSMITTING DEVICE
Kenneth E. Snyder, Northville, Mich., assignor to General Motors Corporation, Detroit, Mich., a corporation of Delaware
Filed Aug. 20, 1959, Ser. No. 835,099
2 Claims. (Cl. 192—69)

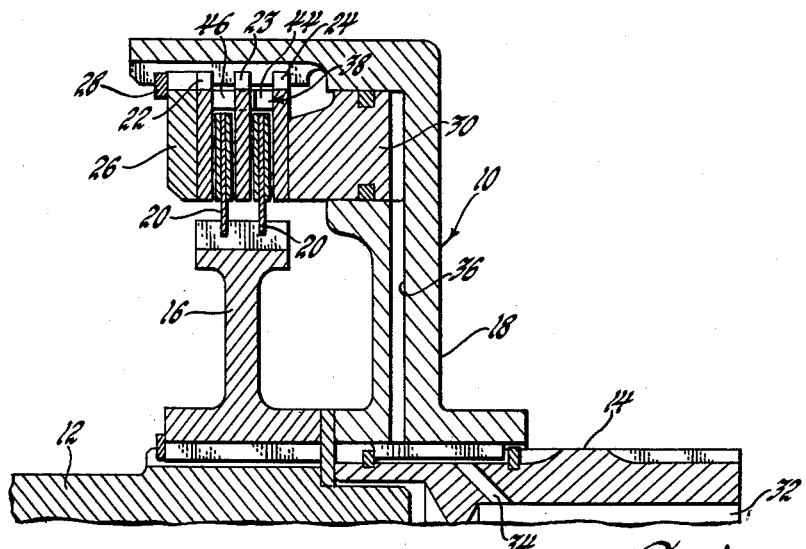

This invention relates to improvements in torque transmitting devices.

It is common practice with torque transmitting devices, such as multi-disk type clutches and brakes, to employ coil springs as either engaging or disengaging agencies. A more specific example of the use of these coil springs is found in the conventional fluid pressure actuated clutch, for there pressure fluid causes a piston to either compress a series of disks into torque transmitting relation, or cause this relationship to be interrupted. If the clutch is pressure engaged, coil springs are employed to return the piston to the disengaged position. On the other hand, if the clutch is pressure disengaged, coil springs move the piston to the engaged position compressing the clutch disks and fluid pressure returns the piston to the disengaged setting.

In either application the coil springs employed require a certain space extending parallel to the rotational axis of the clutch. If the forces to be overcome by the springs are great, the length of the springs will normally have to be increased since the diameter cannot usually be conveniently made greater without reducing the clutch effective area. Obviously, then, increases in axial space requirements elongate the clutch as a unit and present space problems, especially when there are predetermined confinement limitations and also the weight of the clutch is increased.

With the foregoing in mind, the invention contemplates a torque transmitting device employing a novel biasing arrangement for altering the torque transmitting relation between members of the device. The novel biasing arrangement according to the invention affords uniformity of operation and consumes no additional space other than that inherently available.

More specifically, the invention provides the preceding biasing arrangement with a resilient element that may be carried by one of the device members and that in a unique manner affords biasing forces for urging opposite device members out of torque transmitting relation therewith and that when carried by one of the members is self-retaining.

In carrying out the invention according to a preferred form, a device comprising multiple shiftable and relatively rotatable disks are so arranged as to be pressure engaged and spring disengaged. One of the disks carries one or more resilient elements shaped so as to be self-retaining relative to the disk and so as to have oppositely acting spring fingers extending axially therefrom and spaced around the circumference thereof. These oppositely acting fingers urge the opposite disks out of torque transmitting relation with adjacent disks and produce the spring disengagement.

The foregoing and other objects and advantages of the invention will be apparent from the following description and the accompanying drawings in which:

FIGURE 1 is a sectional view of a torque transmitting device demonstrating the principles of the invention;

FIGURE 2 is a view of a disk incorporating a series of resilient elements; and

FIGURE 3 is a view of the disposition between the disks and one of the resilient elements looking in the direction of arrows 3—3 of FIGURE 2.

Referring in detail to the drawings and particularly to FIGURE 1, the torque transmitting device depicted is of the multi-disk clutch character and has been assigned the numeral 10. The clutch 10, when engaged, will transmit torque input and output shafts 12 and 14. If it is desired, the clutch 10 can be transformed into a brake by holding either the input shaft 12 or the output shaft 14.

As displayed in FIGURE 1, the clutch 10 has a hub 16 and a drum 18 splined or otherwise secured respectively to the input and output shafts 12 and 14. In this embodiment two driving annular members as disks 20 are at their inner diameters through an appropriate connection, e.g., splines, drive connected to the outer periphery of the hub 16. These two drive clutch disks 20 intermesh in the illustrated manner with a series of driven annular members as disks 22, 23, and 24. Each of the driven disks 22, 23, and 24 are in turn at their outer diameters drive secured to the drum 18 in any appropriate fashion, for instance, mating teeth.

The material of the disks will of course be determined by the particular installation. However, for exemplary purposes, the driven disks 22, 23, and 24 may be made of steel and the drive disks 20 along the faces thereof may be provided with suitable friction material for engaging and preventing relative rotation between the steel disks 22, 23, 24 and the driving disks 20.

To complete the construction, a pressure or backing plate 26 is installed within the disk pack assemblage and positioned axially with respect thereto by a snap ring 28 retained by the drum 18. An annular piston 30 housed within the drum 18, when fluid pressure actuated, urges the intermeshing disks into engagement by compressing them against the pressure plate 26. Pressure fluid for this purpose may be provided from a proper source through passages 32 and 34 in the output shaft 14, and a passage 36 in the drum 18.

To disengage the disks, the bias arrangement, best depicted in FIGURES 2 and 3, is employed and utilizes a series of resilient elements or release springs 38 installed within notches 40 spaced along the peripheral edge of the middle driven disk 23. For obtaining a uniform disengaging force, preferably the notches 40 are equally spaced with respect to each other, and also, dependent on the force required, the number of notches for co-acting release springs 38 may be increased or decreased with this uniformity of loading kept in mind.

The actual configuration of the release springs 38 is seen in FIGURE 3, and as there shown, the release springs 38 have an intermediate portion 42 positioned within the disk slot 40. Extending in opposite directions from the intermediate portion 42 and along opposite sides of the disks 23 are the spring fingers 44, 46 both employed to give the desired double action as will be apparent. The spring finger 44 has an arcuate portion 48 with abutting surfaces 50 and 52 at opposite ends thereof whereas the spring finger 46 has an arcuate portion 54 formed with similar end abutting surfaces 56 and 58. The relative positions of the abutting surfaces 52 and 56 with respect to the sides of the disk 23 and the notch 40 are such that a viselike or clamping action occurs; therefore, once installed, each of the release springs 38 is self-retaining.

When the clutch 10 is engaged, the driving and driven disks are compressed and the bias afforded by the spring fingers 44 and 46 is overcome. The spaces remaining between the compressed disks are established so that preferably the arcuate portions 48 and 54 of the fingers 44 and 46 are not forced to a flat position. This insures against the possibility of a flat finger interfering with a full clutch engagement. As soon as the pressure acting on the piston 30 is relieved, the clutch 10 will disengage and the spring fingers 44 and 46 will return the opposite disks 22 and 24 to the FIGURE 2 position. The bias force offered by the spring fingers 44 and 46 of course will be determined by the application and several other factors including the arc and the material of the spring fingers 44 and 46. Whether the release springs 38 are in the free position or the compressed position, the self-retaining feature is effective, and hence, centrifugal force will not urge them out of their respective notches 40.

From the foregoing it can be seen that the release springs 38 do not require any axial space that is not inherently available, i.e., the established running clearance between disengaged disks so as to not produce heat due to rubbing of the adjacent surfaces will determine along with the width of the disks the axial dimensions of the clutch and will be adequate for the release springs 38. The number of disks required necessarily is established by the torque ot be transmitted. The disposition of the release springs 38 around the periphery of the disk on which they are carried promotes uniformity of loading and, of course, uniform wear during operation. The double action aspect from a single release spring provides the opposing forces needed to cause the clutch 10 to operate effectively and also the self-retention feature of the release springs 38 eliminates the need of a more complicated mode of holding the release spring in position. The notches employed do not appreciably reduce the available clutch area as would large diameter coil springs.

The invention is to be limited only by the following claims.

I claim:

1. In a torque transmitting device, the combination of plural groups of relatively rotatable driving and driven disks shiftable into torque transmitting engagement relative to each other, one of the disks of one of the groups having circumferentially spaced openings therein, means engaging the driving and driven disks, and biasing means disengaging the driving and driven disks, the biasing means including arcuate resilient elements positioned in each of the openings in said one disk and extending along the sides thereof, the arc of the resilient elements corresponding to the arc of the disk at the respective opening for each resilient element, the resilient elements each having an intermediate clamping portion retaining the resilient elements within the respective openings and end spring fingers of bow shape oppositely extending from the clamping portion so as to form a substantially S-shaped configuration, the spring fingers of each resilient element having the apexes thereof engaging and urging adjacent disks of said one of the groups on opposite sides of said one disk out of torque transmitting relation with the disks of another group, the resilient elements each having a continuous width over the entire length thereof.

2. In combination, a friction disk having a series of circumferentially spaced openings therein and an arcuate resilient element positioned in each of the openings and extending along the opposite sides thereof, the arc of the resilient element corresponding to the arc of the disk at the opening, the resilient elements each having an intermediate clamping portion retaining the resilient elements within their respective openings and end spring fingers of bow shape oppositely extending from the clamping portion so as to be on opposite sides of the disk and so as to form a substantially S-shaped configuration, the spring fingers of each resilient element having the apexes thereof outwardly extending from the disk so as to afford oppositely acting biasing forces, the resilient elements having a continuous width over the entire length thereof.

References Cited in the file of this patent

UNITED STATES PATENTS

| | | |
|---|---|---|
| 998,499 | Gordon | July 18, 1911 |
| 1,973,199 | Conway | Sept. 11, 1934 |
| 2,174,240 | Glenney | Sept. 26, 1939 |
| 2,217,357 | Coe | Oct. 8, 1940 |
| 2,226,309 | Gleasman | Dec. 24, 1940 |
| 2,244,169 | Miller | June 3, 1941 |
| 2,257,877 | Binder | Oct. 7, 1941 |
| 2,600,520 | Spase | June 17, 1952 |

FOREIGN PATENTS

| | | |
|---|---|---|
| 7,848 | Great Britain | of 1906 |
| 814,318 | France | Mar. 15, 1937 |
| 905,019 | France | Mar. 26, 1945 |
| 614,913 | Great Britain | Dec. 30, 1948 |
| 501,580 | Italy | Nov. 25, 1954 |